United States Patent
Huh et al.

(10) Patent No.: US 12,045,337 B2
(45) Date of Patent: Jul. 23, 2024

(54) APPARATUS AND METHOD FOR PROVIDING SECURE EXECUTION ENVIRONMENT FOR NPU

(71) Applicant: Samsung Electronics Co., Ltd., Suwon-si (KR)

(72) Inventors: Jaehyuk Huh, Daejeon (KR); Sunho Lee, Daejeon (KR); Seonjin Na, Daejeon (KR)

(73) Assignees: Samsung Electronics Co., Ltd., Gyeonggi-do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 242 days.

(21) Appl. No.: 17/749,386

(22) Filed: May 20, 2022

(65) Prior Publication Data
US 2022/0374513 A1    Nov. 24, 2022

(30) Foreign Application Priority Data

| | | |
|---|---|---|
| May 21, 2021 | (KR) | 10-2021-0065707 |
| Nov. 12, 2021 | (KR) | 10-2021-0156063 |
| May 4, 2022 | (KR) | 10-2022-0055712 |

(51) Int. Cl.
*G06F 21/53* (2013.01)

(52) U.S. Cl.
CPC ........ *G06F 21/53* (2013.01); *G06F 2221/033* (2013.01)

(58) Field of Classification Search
CPC ..... G06F 21/53; G06F 2221/033; G06F 21/57
See application file for complete search history.

(56) References Cited

U.S. PATENT DOCUMENTS

| | | |
|---|---|---|
| 8,972,746 B2 | 3/2015 | Johnson et al. |
| 9,087,200 B2 | 7/2015 | McKeen et al. |
| 10,496,841 B2 | 12/2019 | Nadler et al. |
| 10,511,598 B2 | 12/2019 | Shanahan et al. |
| 10,757,474 B2 | 8/2020 | Harvey |
| 10,797,856 B2 | 10/2020 | Mandal et al. |
| 10,860,710 B2 | 12/2020 | Wei et al. |

(Continued)

FOREIGN PATENT DOCUMENTS

| | | |
|---|---|---|
| KR | 10-2105760 B1 | 4/2020 |
| KR | 10-2365263 B1 | 2/2022 |

OTHER PUBLICATIONS

Brian Rogers et al., "Using Address Independent Seed Encryption and Bonsai Merkle Trees to Make Secure Processors OS- and Performance-Friendly," 40th Annual IEEE/ACM International Symposium on Microarchitecture (MICRO 2007), Dec. 1-5, 2007.

(Continued)

*Primary Examiner* — Beemnet W Dada
(74) *Attorney, Agent, or Firm* — Harness, Dickey & Pierce, P.L.C.

(57) ABSTRACT

An electronic device includes a System on Chip (SoC) and a memory. The SoC includes a processor and a neural processing unit (NPU). The memory includes an enclave page cache (EPC), in which a validation table is stored, and at least one NPU enclave. The NPU enclave and the EPC have a trusted execution environment, which is isolated from an execution environment in which system software of the CPU is executed.

20 Claims, 12 Drawing Sheets

(56) References Cited

U.S. PATENT DOCUMENTS

| | | | | |
|---|---|---|---|---|
| 2017/0024569 | A1 | 1/2017 | Xing et al. | |
| 2020/0082279 | A1* | 3/2020 | Arora | G06N 3/045 |
| 2020/0379923 | A1* | 12/2020 | Lidman | G06F 12/0207 |
| 2020/0412521 | A1* | 12/2020 | Shi | G06Q 20/308 |
| 2021/0103470 | A1* | 4/2021 | Yao | G06N 3/063 |
| 2022/0114014 | A1* | 4/2022 | Chen | G06F 21/52 |
| 2022/0245237 | A1* | 8/2022 | Briongos | G06F 21/53 |
| 2023/0094125 | A1* | 3/2023 | Rogers | G06F 21/53 713/190 |
| 2023/0133033 | A1* | 5/2023 | Zimmermann | G06N 3/08 726/19 |

OTHER PUBLICATIONS

Ananda Samajdar et al., "A Systematic Methodology for Characterizing Scalability of DNN Accelerators using SCALE-Sim," 2020 IEEE International Symposium on Performance Analysis of Systems and Software (ISPASS), Aug. 23-25, 2020.

Seonjin Na et al., "Common Counters: Compressed Encryption Counters for Secure GPU Memory," 2021 IEEE International Symposium on High-Performance Computer Architecture (HPCA), Feb. 27-Mar. 3, 2021.

Bongjoon Hyun et al, "NeuMMU: Architectural Support for Efficient Address Translations in Neural Processing Units," Nov. 15, 2019.

Stavros Volos et al., "Graviton: Trusted Execution Environments on GPUs," 13th USENIX Symposium on Operating Systems Design and Implementation, Oct. 8-10, 2018.

Ralph C. Merkle, "Protocols for Public Key Cryptosystems," 1980 IEEE Symposium on Security and Privacy, Apr. 14-16, 1980.

Gururaj Saileshwar et al., "Morphable Counters: Enabling Compact Integrity Trees for Low-Overhead Secure Memories," 2018 51st Annual IEEE/ACM International Symposium on Microarchitecture (MICRO) Oct. 20-24, 2018.

Chenyu Yan et al., "Improving Cost, Performance, and Security of Memory Encryption and Authentication," 33rd International Symposium on Computer Architecture (ISCA-33), Jun. 2006.

Shih-Chieh Lin et al., "The Architectural Implications of Autonomous Driving: Constraints and Acceleration," 2018 Association for Computing Machinery, Mar. 24-28, 2018.

* cited by examiner

FIG. 3

Validation Table

| Physical Address | Virtual Address | Context ID | Size | Read Only |
|---|---|---|---|---|
| 0x0FF... | 0x426... | 1 | 0x320 | 1 |
| 0x096... | 0x748... | 2 | 0x400 | 0 |
| ... | ... | ... | ... | ... |

APPARATUS AND METHOD FOR PROVIDING SECURE EXECUTION ENVIRONMENT FOR NPU

CROSS-REFERENCE TO RELATED APPLICATIONS

This application is based on and claims priority under 35 U.S.C. § 119 to Korean Patent Applications Nos. 10-2021-0065707, 10-2021-0156063 and 10-2022-0055712, respectively filed on May 21, 2021, Nov. 12, 2021, and May 4, 2022, in the Korean Intellectual Property Office, the disclosures of which are incorporated herein in their entireties by reference.

BACKGROUND

The inventive concepts relate to a data security, and more particularly, to an apparatus and method of providing a secure execution environment for a neural processing unit (NPU) to maintain the security of data processed by the NPU.

In recent years, as artificial intelligence (AI) technology develops, the importance of NPUs is increasing. To perform various operations, such as autonomous driving techniques, the need for System on Chips (SoCs) on which processing devices (e.g., central processing units (CPU) and NPUs) are mounted is increasing.

Inappropriate and/or malicious external attacks on data processed by an NPU may cause leakage of personal and confidential information, and serious problems may occur in an electronic device due to a malfunction in the NPU. Therefore, data security for protecting data from external attacks is a very important issue. To protect data from advanced attacks, there is a need for technology that may efficiently maintain the security of the NPU by using both software and hardware.

SUMMARY

The inventive concepts provide an apparatus and method for providing a secure execution environment for a neural processing unit (NPU), which is included in a System on Chip (SoC), from external software attacks or hardware attacks.

The technical objectives of the inventive concepts are not limited to the above disclosure; and other objectives may become apparent to those of ordinary skill in the art based on the following descriptions.

According to an aspect of the inventive concepts, there is provided an electronic device including an SoC and a memory. The SoC includes a processor configured to control the SoC and an NPU. The memory includes an enclave page cache (EPC), in which a validation table is stored, and at least one NPU enclave. The NPU enclave and the EPC have a trusted execution environment (TEE). The TEE is isolated from an execution environment in which system software of the processor is executed.

According to another aspect of the inventive concept, there is provided an operating method of an SoC including a processor configured to control the SoC and an NPU. The method includes transmitting, by the processor, data from at least one NPU enclave included in an external memory to an internal memory included in the SoC' performing, by the NPU, an NPU operation, based on the data; and transmitting a result of the NPU operation to the external memory. The at least one NPU enclave has a trusted execution environment (TEE). The TEE is isolated from an execution environment in which system software of the processor is executed.

According to another aspect of the inventive concept, there is provided an operating method of an SoC including a processor configured to control the SoC and an NPU. The method includes controlling access of a program to an NPU enclave; and performing a counter mode encryption/decryption operation. The NPU enclave is a region of a memory, which is used by the NPU. The NPU enclave has a trusted execution environment (TEE). The TEE is isolated from an execution environment in which system software of the processor is executed.

BRIEF DESCRIPTION OF THE DRAWINGS

Some example embodiments of the inventive concepts will be more clearly understood from the following detailed description taken in conjunction with the accompanying drawings in which:

FIG. 3 is a diagram of an example of a validation table according to some example embodiments;

DETAILED DESCRIPTION OF THE EMBODIMENTS

Hereinafter, some example embodiments will be described in detail with reference to the accompanying drawings. In the description, the elements and/or functional blocks disclosed may, unless indicated otherwise, be included in and/or be implemented in processing circuitry such as hardware including logic circuits; a hardware/software combination such as a processor executing software; or a combination thereof. The processing circuitry may include electrical components such as at least one of transistors, resistors, capacitors, etc. and/or may include electrical components such as logic gates including at least one of AND gates, OR gates, NAND gates, NOT gates, XOR gates, etc.

Figure 1:
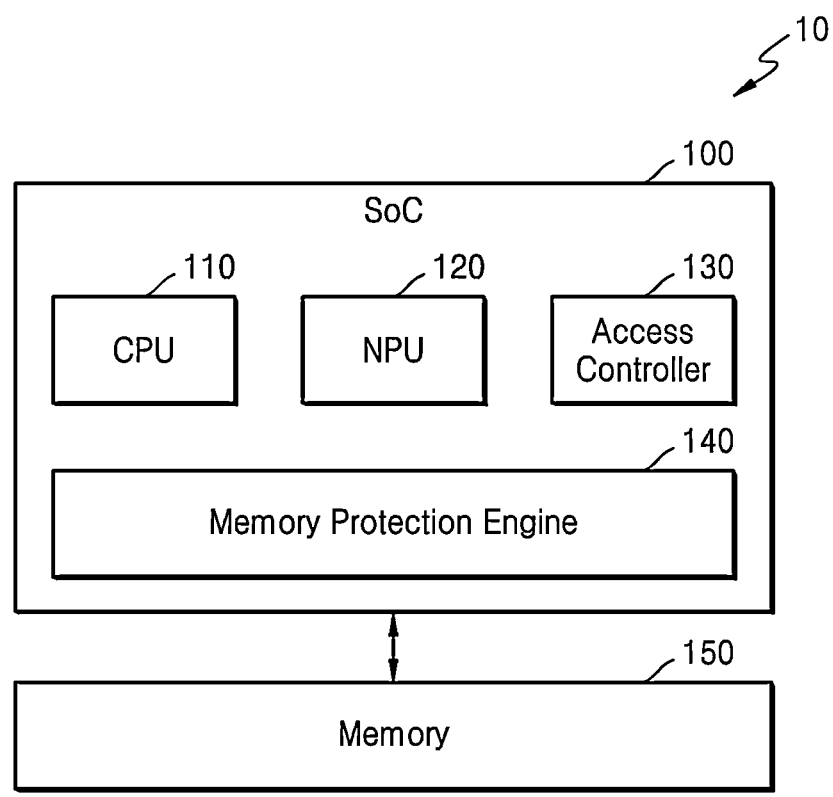
FIG. 1 is a block diagram of an example of an electronic device according to some example embodiments.

FIG. 1 is a block diagram of an example of an electronic device 10 according to some example embodiments.

In some embodiments, the electronic device 10 may be applied to a drone, an advanced driver assistance system (ADAS), a smart TV, a smartphone, a medical device, a mobile device, an image display device, a measuring device, and/or an Internet of Things (IoT) device, without being limited thereto. In addition, the electronic device 10 may be mounted on one of various other kinds of devices.

As shown in FIG. 1, the electronic device 10 may include a System on Chip (SoC) 100 and a memory 150. The SoC 100 and the memory 150 may exchange data with each other.

The SoC 100 may include a processor (such as a central processing unit (CPU) 110), a neural processing unit (NPU) 120, an access controller 130, and/or a memory protection engine 140. Although not shown in FIG. 1, in addition to the components described above, the SoC 100 may further include other components, such as a graphics processing unit (GPU), an internal memory of the SOC 100, other general use components, and/or the like.

The CPU 110 may be a processor configured to control some and/or all components included in the SoC 100 and/or the electronic device 10 and/or, the CPU 110 may receive data from the memory 150. For example, the CPU 110 may control the internal memory of the SoC 100 to receive data from the memory 150. In some example embodiments, the internal memory of the SoC 100 may be (and/or include) a scratchpad memory included in the NPU 120 and/or a memory included in the SoC 100 separate from the NPU 120. When the internal memory of the SoC 100 is a scratchpad memory, the internal memory may be static random access memory (SRAM), without being limited thereto. Also, the CPU 110 may control the NPU 120 to perform an NPU operation (e.g., a multiplication operation) based on the data received from the memory 150. In addition, the CPU 110 may transmit a result of the NPU operation, e.g., to the memory 150.

The access controller 130 may control the access of programs executed by the CPU 110 and/or the NPU 120 to the memory 150. For example, when a program attempts to access a specific region included in the memory 150, the access controller 130 may validate the program and/or block access. The access controller 130 will be described in detail below.

The memory protection engine 140 may perform an encryption and/or decryption operation. For example, because the outside of the SoC 100 may be a target of malicious software attacks, when internal data of the SoC 100 is transmitted to outside the SoC 100, the memory protection engine 140 may encrypt the internal data. Also, when the memory protection engine 140 receives data from the outside, the memory protection engine may decrypt the externally received encrypted data. The memory protection engine 140 will be described in detail below.

The memory 150 may be a memory outside the SoC 100. For example, the memory 150 may be volatile memory (such as a dynamic random access memory (DRAM)), without being limited thereto. In addition, the CPU 110 may share the memory 150 with the NPU 120. As described in further detail below, the memory 150 may be partitioned such that the memory 150 includes a region for the CPU 110, a region for the NPU 120, and/or a region shared by the CPU 110 and the NPU 120. For example, in some example embodiments, the memory 150 may include at least one region shared by the CPU 110 and the NPU 120 such that data stored in the region is read/write data for one of CPU 110 and the NPU 120 and read-only data for the other.

As the outside of the SoC 100 may not be secure from malicious attacks, the memory 150 may be vulnerable in security. For example, the memory 150 may be vulnerable due to a malicious operating system's access to a page table, which is stored in the memory 150 and used by user applications. Also, a communication path between the memory 150 and the SoC 100 may be intercepted, and the memory 150 may be vulnerable due to external hardware attacks, such as a cold boot attack. Accordingly, the NPU 120 configured to process data stored in the memory 150 may not have a secure execution environment. Therefore, the memory 150 may need to include a memory region having a secure execution environment. In some embodiments, the memory 150 may include an NPU enclave and, thus, provide a secure execution environment for the NPU 120. The memory 150 and the NPU enclave will be described in detail below.

Figure 2:
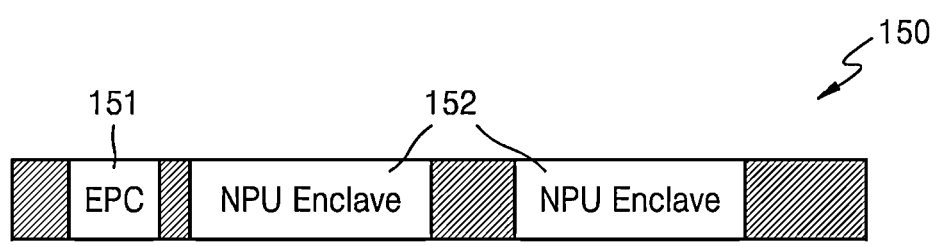
FIG. 2 is a diagram of an example of a memory according to some example embodiments.

FIG. 2 is a diagram of an example of a memory according to some example embodiments. Hereinafter, FIG. 2 will be described with reference to FIG. 1.

As shown in FIG. 2, the memory 150 may include an enclave page cache (EPC) 151 and/or an NPU enclave 152. The EPC 151 and the NPU enclave 152 may be regions included in the memory 150. Specifically, the NPU enclave 152 may be a memory region, from among a plurality of memory regions included in the memory 150, which may be accessed by the NPU 120. The memory 150 may include at least one NPU enclave 152. For example, the NPU enclave 152 is illustrated as two regions in FIG. 2, but the example embodiments are not limited thereto.

The EPC 151 and the NPU enclave 152 may have a trusted execution environment (TEE), which is isolated from an execution environment in which the system software of the CPU 110 is executed. Because the EPC 151 and the NPU enclave 152 have an execution environment that is isolated from the system software of the CPU 110, even when the system software cannot be trusted, the EPC 151 and the NPU enclave 152 may have a secure execution environment. The TEE may be provided by an access control operation, and the access control operation may be performed by the access controller 130. The access control operation may refer to an operation of blocking a program attempting to access the memory 150 from accessing the memory 150, e.g., when the program is not a program that may access.

In some example embodiments, the TEE may be provided by additional hardware other than the access controller 130. For example, the EPC 151 may be a memory region having an execution environment that is secured by the CPU 110 and/or other processing circuitry.

FIG. 3 is a diagram of an example of a validation table according to some example embodiments. Hereinafter, FIG. 3 will be described with reference to FIGS. 1 and 2.

Referring to FIG. 3, in some embodiments, the validation table may include a table including information about a physical address, a virtual address, whether data is read-only data, and/or a data size. The validation table shown in FIG. 3 is only an example, and the validation table may further include various pieces of information that are not shown in FIG. 3.

An EPC 151 may be stored in the validation table and/or the validation table may be stored in the EPC 151. The validation table may be secured from attacks of unreliable system software.

The access controller 130 may perform an access control operation based on the validation table. For example, based on the validation table, the access controller 130 may determine whether a program attempting to access the NPU enclave 152 is a program that may access the NPU enclave 152. The validation table may include information about an NPU enclave identification (ID) of the program that may access the NPU enclave 152. In an address translation process performed by an input/output memory management unit (IOMMU) of an NPU, when the NPU enclave ID of the program attempting to access the NPU enclave 152 is not the same as an NPU enclave ID included in the validation table, the access controller 130 may block the program from making access. For example, the access controller 130 may block a program from making accessing the NPU enclave 152 when the NPU enclave ID is not included in and/or is different from the NPU enclave ID stored the validation table. The address translation process may be a process of translating a virtual address into a physical address when a miss occurs in a translation lookaside buffer (TLB).

The access controller 130 may block an unauthorized program from accessing the NPU enclave 152, and thus, a TEE may be provided to the NPU 120. The unauthorized program may also include unreliable system software of the CPU 110. Thus, the access of system software to the NPU enclave 152 may also be restricted.

Figure 4:
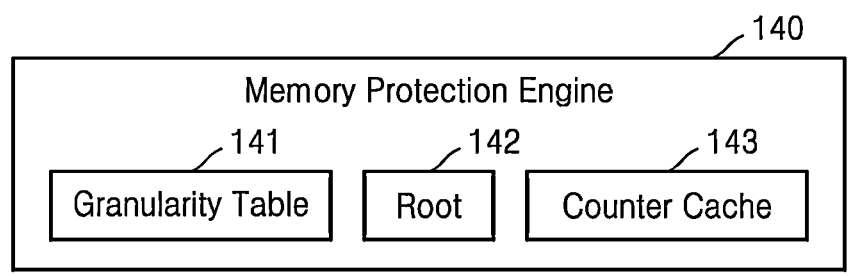
FIG. 4 is a diagram of an example of a memory protection engine according to some example embodiments.

FIG. 4 is a diagram of an example of a memory protection engine 140 according to some example embodiments. Hereinafter, FIG. 4 will be described with reference to FIGS. 1 and 2.

Referring to FIG. 4, the memory protection engine 140 may include a granularity table 141, a root 142, and/or a counter cache 143.

The memory protection engine 140 may perform an encryption and/or decryption operation for security. For example, the memory protection engine 140 may perform a counter mode encryption/decryption operation. In some example embodiments, the memory protection engine 140 may efficiently perform the counter mode encryption/decryption operation, based on the granularity table 141. A granularity may indicate a size of data blocks configured to share the same counter therebetween, when the counter mode encryption/decryption operation is performed. In addition, the granularity table 141 may be a table including information about the granularity. Furthermore, the memory protection engine 140 may use the counter cache 143 and a counter to perform the counter mode encryption/decryption operation. The counter mode encryption/decryption operation will be described in further detail below.

The memory protection engine 140 may maintain the security of the SoC 100 by validating the integrity of data read from the memory 150. For example, the memory protection engine 140 may perform a data integration validation operation by using message authentication code (MAC). The data integrity validation operation may include validating data corruption and data tampering.

The memory protection engine 140 may prevent a replay attack and/or increase a security level of the SoC 100 by constructing an integrity tree. The memory protection engine 140 may use the root 142 to construct the integrity tree. The construction of the tree will be described in further detail below.

Figure 5:
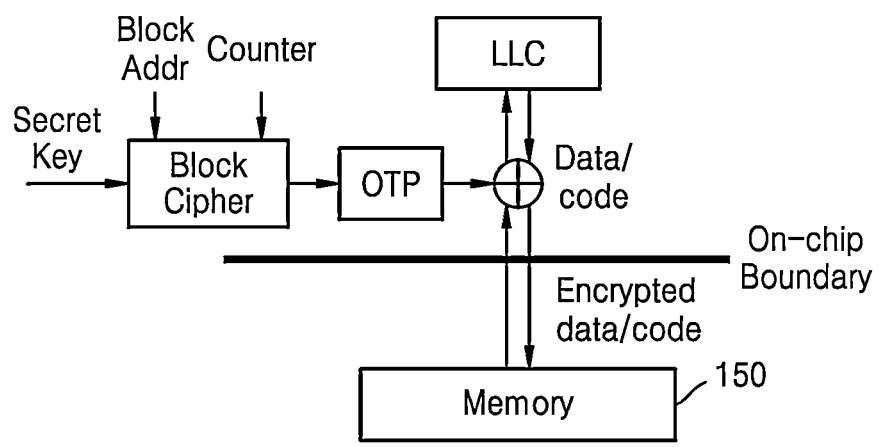
FIG. 5 is a diagram of an example of a counter mode encryption method according to some example embodiments.

FIG. 5 is a diagram of an example of a counter mode encryption method according to some example embodiments. Hereinafter, FIG. 5 will be described with reference to FIGS. 1 to 4.

The counter mode encryption operation method may be an encryption method in which a counter value increasing in increments (e.g., of 1) is encrypted to generate a key stream. In a counter mode encryption operation, a counter may be allocated for a unit of one cache line, and the counter value may be increased whenever data of a cache line is changed.

In some example embodiments, a one-time-pad (OTP) may be generated by a block cipher, based on a secret key, a block address block addr, and a counter value. The counter mode encryption operation may be performed by performing an XOR operation on the generated OTP and data. In some example embodiments, a last-level cache LLC may be included, which may act as a buffer between, e.g., the memory 150 and the CPU 110 (and/or NPU 120).

Read-only data may be stored in a memory 150. For example, for machine learning inference, weight data may be stored as read-only data in many regions of the memory 150. In the counter mode encryption/decryption operation, a counter value for the read-only data may be maintained (e.g., at 1) without increasing. Accordingly, when data to be encrypted/decrypted is read-only data, an encryption/decryption operation may be performed by using a value of 1 without access to the counter cache 143 and the counter. As a result, the efficiency of the counter cache 143 may be increased, and thus, the memory 150 may be efficiently protected.

In some example embodiments, a validation table may include a read-only ID bit indicating whether data is read-only data. When it is determined that the data is the read-only data based on the read-only ID bit, the memory protection engine 140 may set the counter value to 1 and perform a counter mode encryption/decryption operation. Referring to FIG. 3, when the data is the read-only data, a value of the read-only ID bit may be 1, without being limited thereto.

Figure 6:
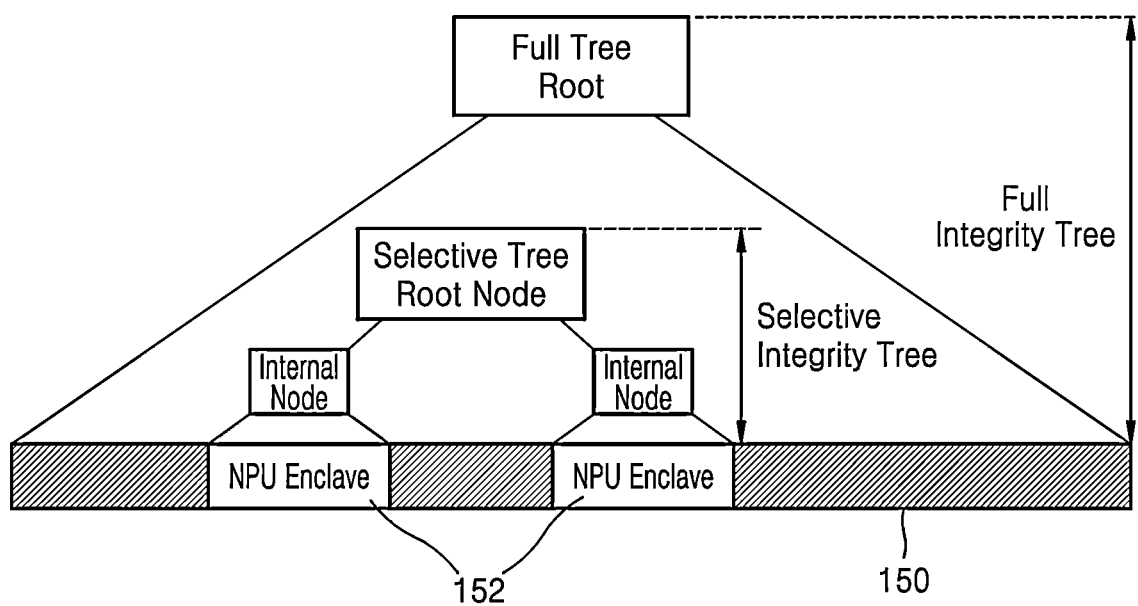
FIG. 6 is a diagram of an example of a selective integrity tree according to some example embodiments.

FIG. 6 is a diagram of an example of a selective integrity tree according to some example embodiments. Hereinafter, FIG. 6 will be described with reference to FIGS. 1 and 2.

Referring to FIG. 6, the memory protection engine 140 may construct a tree for integrity validation. For example, the memory protection engine 140 may validate the integrity of data by constructing a Merkle tree (or hash tree) with a hash value of a memory block.

However, as more regions of the memory 150 are used to construct the tree, the number of branches (or inner nodes) included in the tree and/or the height of the tree may increase, and, therefore, an operation related to the tree may be more inefficient. Thus, to improve the performance of the NPU 120, it may be beneficial (and/or necessary) to reduce the tree height.

The construction of a tree for the entire memory 150 may be inefficient since the NPU 120 uses only a portion of the memory 150, and may therefore cause a performance degradation of the electronic device 10. Accordingly, the memory protection engine 140 may construct a tree for some of the regions of the memory 150. For example, the memory protection engine 140 may validate the integrity of data by constructing a tree for at least one NPU enclave 152 included in the memory 150. A tree constructed for the entire memory 150 may be referred to as a full integrity tree, and a tree constructed for the NPU enclave 152 may be referred to as a selective integrity tree. As shown in FIG. 6, a height of the full integrity tree for the entire memory 150 may be greater than a height of the selective integrity tree for the at least one NPU enclave 152, which is a partial region of the memory 150. Therefore, the memory protection engine 140 may construct the selective integrity tree having a small tree height, thereby reducing the performance degradation of the NPU 120. In addition, the root 142 included in the memory protection engine 140 may point to a root node, which is a topmost node of the selective integrity tree.

Figure 7:
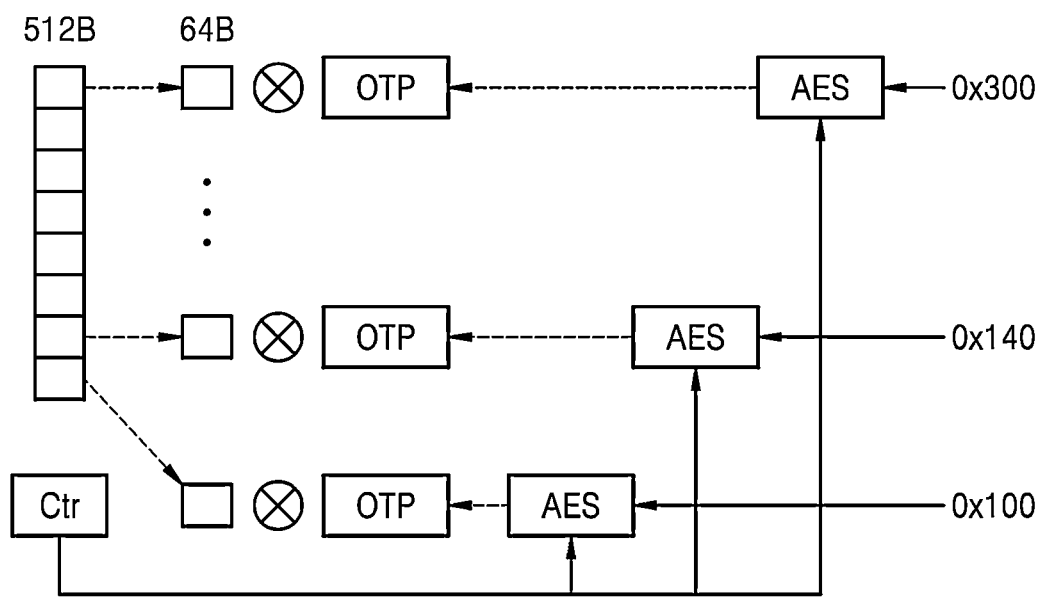
FIG. 7 is a diagram of an example of a counter mode encryption method of a memory, according to some example embodiments.

FIG. 7 is a diagram of an example of a counter mode encryption method of a memory, according to some example embodiments. Hereinafter, FIG. 7 will be described with reference to FIGS. 1, 2, and 4.

As described above, a granularity may refer to a size of data blocks configured to share the same counter therebetween, when a counter mode encryption/decryption operation is performed.

FIG. 7 illustrates an example of a process of performing a counter mode encryption operation at a granularity of 512 bits (or 512B). One counter Ctr may be shared between the 512B data blocks, and an operation may be performed on every 64B data block of the 512B data block and an OTP, but the example embodiments are not limited thereto. The OTP may be generated by using an advanced encryption standard (AES) method based on a counter value, key, or a block address (e.g., 0x100).

When a great granularity of, for example, 512B is supported and the counter mode encryption/decryption operation is performed at the great granularity, the counter cache 142 included in the memory protection engine 140 may be efficiently utilized. However, when the counter mode encryption/decryption operation is performed at the great granularity, if irregular memory access occurs, performance degradation may occur due to counter overflow. A granularity at which the counter mode encryption/decryption operation may be efficiently performed may be different depending on a machine learning method executed in the NPU 120. Accordingly, the memory protection engine 140 may perform the counter mode encryption/decryption operation at a different granularity according to the machine learning method executed in the NPU 120. For example, the memory protection engine 140 may adaptively perform the counter mode encryption/decryption operation at a granularity of 64B, 128B, 256B, and/or 512B according to a machine learning method executed in the NPU 120, without being limited thereto. For example, though FIG. 7 illustrates a 512B granularity including an octet of 64B, the greater granularity and/or the other granularities may include other values. Information about an optimum granularity for the machine learning method executed in the NPU 120 may be included in the granularity table 141.

Figure 8:
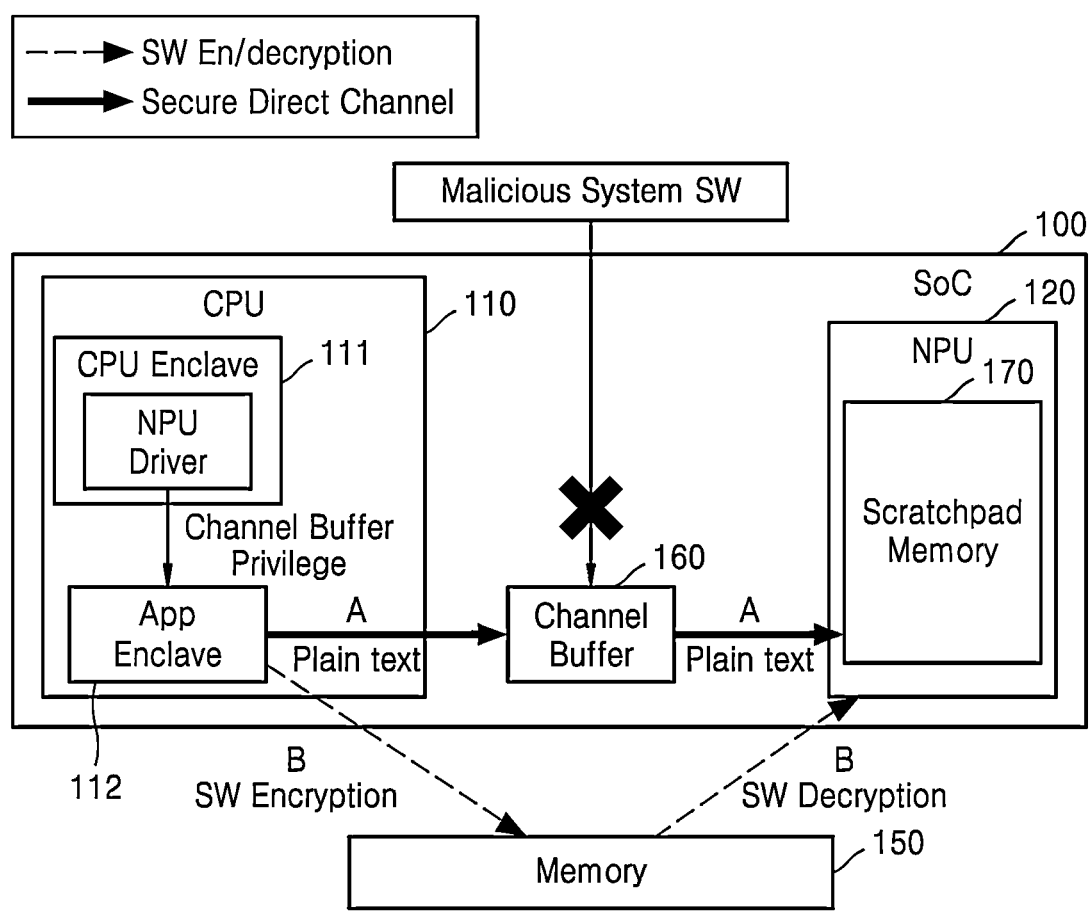
FIG. 8 is a diagram including an example of a channel buffer according to some example embodiments.

FIG. 8 is a diagram of an example including a channel buffer according to some example embodiments. Hereinafter, FIG. 8 will be described with reference to FIGS. 1 and 2.

As shown FIG. 8, the SoC 100 may include a channel buffer 160 configured to connect the CPU 110 with the NPU 120.

Because data transfer A between the CPU 110 and the NPU 120 may be performed through the channel buffer 160 in the SoC 100, a memory 150, which is outside the SoC 100, may not be used during the data transfer A. Accordingly, an encryption/decryption process B, which is performed when data is transmitted between the CPU 110 and the NPU 120 by using the memory 150, may be omitted, and a process of using the memory protection engine 140 may be omitted. Thus, data transfer may be performed without additional performance degradation caused by the protection of the memory 150.

In addition, the CPU 110 may include a CPU enclave 111, which is a region having a TEE that is isolated from an execution environment in which system software of the CPU 110 is executed. The CPU enclave 111 may include, for example an NPU driver, and the NPU driver may grant the right to use the channel buffer 160 to an application that requests the use the NPU 120. For example, the NPU driver may grant the right to use the channel buffer 160 to an application that may be executed by an application (APP) enclave 112. The APP enclave 112 may be a region that is included in the CPU 110 and has a TEE. Because the NPU driver may be executed by the CPU enclave 111, which is a secure region of the CPU 110, the channel buffer 160 may be secure from malicious system software. Accordingly, malicious system software may be prevented from attacking the channel buffer 160. Therefore, unencrypted plain text from the CPU 110 may be safely transmitted through the channel buffer 160 to a scratchpad memory 170 included in the NPU 120.

Figure 9:
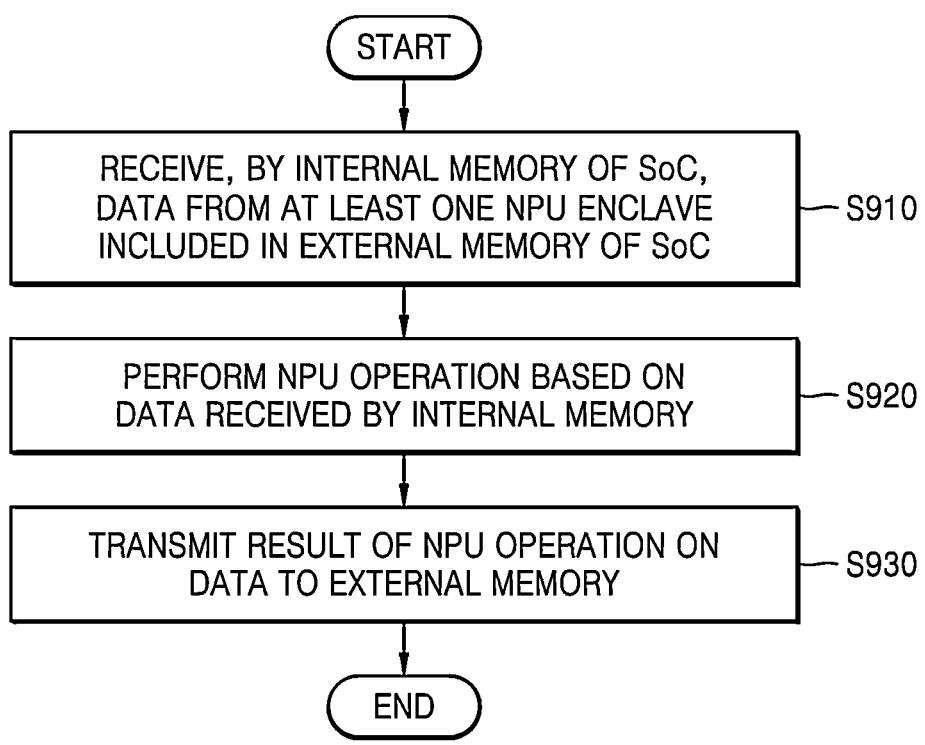
FIG. 9 is a diagram of an example method of providing a secure execution environment for a neural processing unit (NPU), according to some example embodiments.

FIG. 9 is a diagram of an example method of providing a secure execution environment for an NPU, according to some example embodiments. Hereinafter, FIG. 9 will be described with reference to FIGS. 1, 2, and 8.

In operation S910, the CPU 110 may control an internal memory included in the SoC 100 to receive data from at least one NPU enclave 152 included in the memory 150, which is outside the SoC 100. The at least one NPU enclave 152 may have a TEE, which is isolated from an execution environment in which system software of the CPU 110 is executed. The memory protection engine 140 included in the SoC 100 may perform a counter mode decryption operation on data, which is transmitted from the memory 150, which is outside the SoC 100, to the internal memory. Also, the memory protection engine 140 may validate the integrity of data by constructing a tree for the at least one NPU enclave 152, from among regions included in the memory 150 that is outside the SoC 100. In addition, when it is determined that the data is read-only data, the memory protection engine 140 may perform the counter mode decryption operation by setting a counter value to 1. Furthermore, the memory protection engine 140 may perform the counter mode decryption operation at a different granularity according to a machine learning method executed by the NPU 120. As used herein, a granularity may indicate a size of data blocks configured to share the same counter therebetween when a counter mode encryption/decryption operation is performed.

In operation S920, the NPU 120 may perform an NPU operation based on the data received by the internal memory.

In operation S930, the CPU 110 may transmit a result of the NPU operation to the memory 150, which is outside the SoC 100. Various programs that may be executed by the CPU 110 or the NPU 120 may attempt to access the memory 150. The access controller 130 may control the access to the at least one NPU enclave 152. In addition, the access controller 130 may determine whether the program is a program that may access the at least one NPU enclave 152, based on a validation table stored in the EPC 151 included in the memory 150, which is outside the SoC 100. Furthermore, in an address translation process performed by an IOMMU of the NPU 120, when an NPU enclave ID of the program is not the same as (and/or not included in) an NPU enclave ID included in the validation table, the access controller 130 may block the program from making access.

The memory protection engine 140 may perform a counter mode encryption operation based on the result of the NPU operation. Also, the memory protection engine 140 may perform the counter mode encryption operation at a different granularity according to a machine learning method executed by the NPU 120. For example, the granularity may be set based on the size of and/or level of detail in the data analyzed and/or processed by the machine learning method executed by the NPU 120.

The SoC 100 may include a channel buffer 160 configured to connect the CPU 110 with the NPU 120. In addition, the CPU 110 may communicate with the NPU 120 through the channel buffer 160. Therefore, in some example embodiments, the CPU 110 may be prevented from directly communicating with the NPU 120.

The CPU 110 may include a CPU enclave 111, which is a region having the TEE that is isolated from an execution environment in which system software of the CPU 110 is executed. An NPU driver may be executed in the CPU enclave 111. Furthermore, by executing the NPU driver, the CPU 110 may grant the right to use the channel buffer 160 to an application that desires to use the NPU 120.

Figure 10:
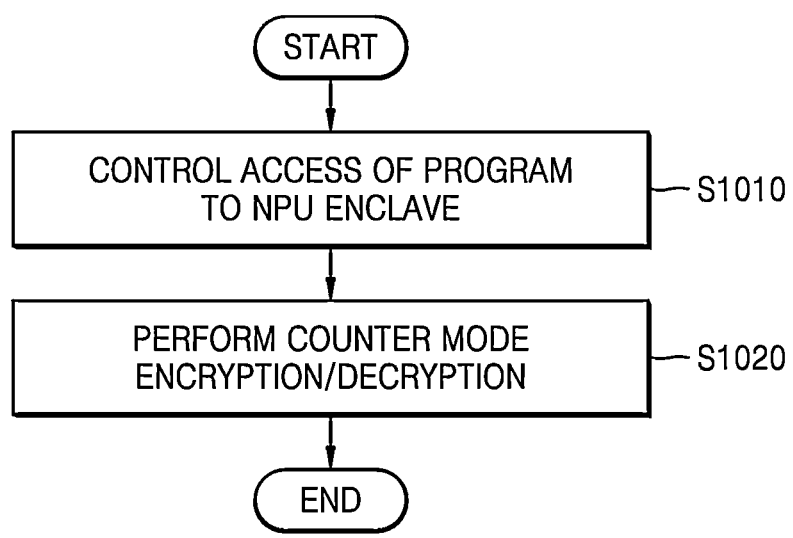
FIG. 10 is a diagram of an example method of providing a secure execution environment for an NPU, according to some example embodiments.

FIG. 10 is a diagram of an example method of providing a secure execution environment for an NPU, according to some example embodiments. Hereinafter, FIG. 10 will be described with reference to FIGS. 1, 2, and 8.

In operation S1010, the access controller 130 included in the SoC 100 may control the access of a program to an NPU enclave 152. Also, the access controller 130 may determine whether the program is a program that has access to and/or is accessible to the NPU enclave 152, based on a validation table stored in an EPC included in the memory 150.

In operation S1020, the memory protection engine 140 included in the SoC 100 may perform a counter mode encryption/decryption operation. In addition, the memory protection engine 140 may validate the integrity of data by configuring a tree for the NPU enclave 152, from among regions included in the memory 150.

Figure 11:
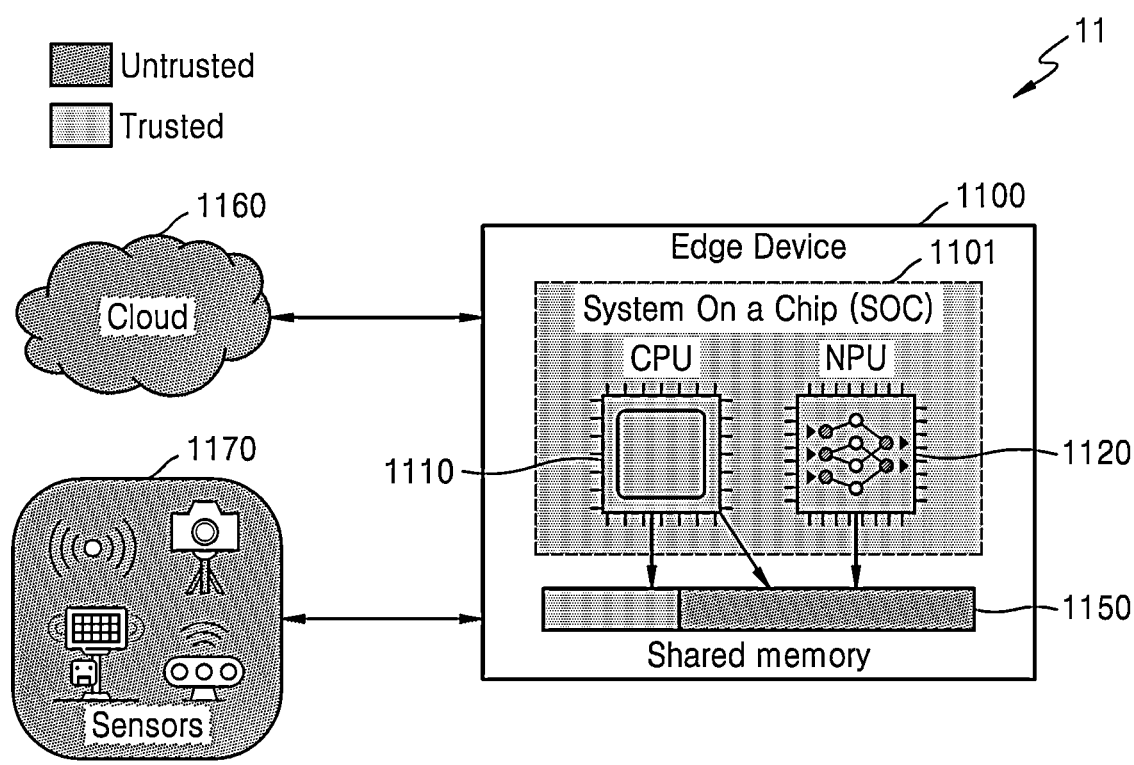
FIG. 11 is a diagram of an example of a system according to some example embodiments.

FIG. 11 is a diagram of an example of a system 11 according to some example embodiments.

Referring to FIG. 11, the system 11 may include an edge device 1100, a cloud 1160, and/or sensors 1170.

The edge device 1100 may include an SoC 1101 and a shared memory 1150. The SoC 1101 may include a CPU 1110 and an NPU 1120. The CPU 1110 may share the shared memory 1150 with the NPU 1120. For example, the SoC 1101 may correspond to the SoC 100 of FIG. 1, and the shared memory 1150 may correspond to the memory 150 of FIG. 1.

The edge device 1100 may receive data from the sensors 1170 and process the received data. In the processing of processing the data, a machine learning method using the NPU 1120 may be utilized. In addition, the edge device 1100 may store the processed data in the cloud 1160. When the edge device 1100 receives data from the sensors 1170, processes the data, and transmits the processed data to the cloud 1160, the transmitted and received data may be safely protected. For example, the security of the data transmitted and received in the system 11 may be maintained by the edge device 1100 that operates according to the embodiments described above with reference to FIGS. 1 to 10.

Figure 12:
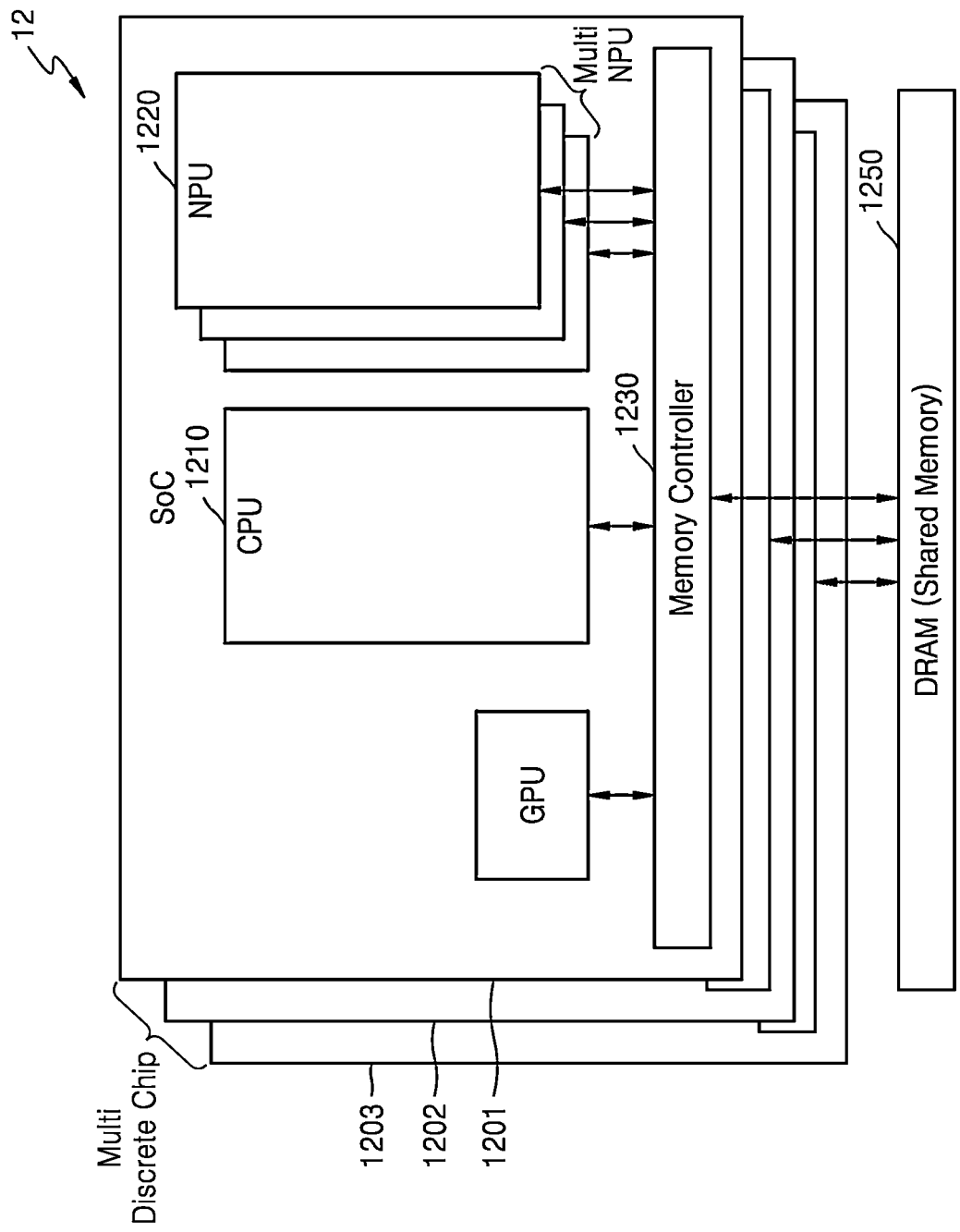
FIG. 12 is a diagram of an example of an electronic device according to some example embodiments.

FIG. 12 is a diagram of an example of an electronic device according to some example embodiments.

FIGS. 1 to 11 pertain to a case in which one SoC operates. However, referring to FIG. 12, in some embodiments, a plurality of SoCs (e.g., 1201 to 1203), which are discrete from each other, may be included in an electronic device 12. A memory 1230 may be shared among the plurality of SoCs (e.g., 1201 to 1203). In some embodiments, the shared memory 1230 is illustrated as DRAM in FIG. 12, but the example embodiments are not limited thereto. The plurality of SoCs (e.g., 1201 to 1203) may have structures corresponding to each other. Alternatively, some of the plurality of SoCs (e.g., 1201 to 1203) may have different structures. As a representative example, the SoC 1201 will now be described. The SoC 1201 may include a CPU 1210 and at least one NPU 1220. In addition, the SoC 1201 may further include a GPU as needed. Furthermore, a plurality of NPUs 1220 may be in one chip as needed. The electronic device 12 may operate according to the embodiments described above with reference to FIGS. 1 to 11. As a result, the security of the electronic device 12 may be maintained.

While the inventive concepts have been particularly shown and described with reference to embodiments thereof, it will be understood that various changes in form and details may be made therein without departing from the spirit and scope of the following claims.

What is claimed is:

1. An electronic device comprising:
   a System on Chip (SoC) comprising a processor configured to control the SoC and a neural processing unit (NPU); and
   a memory comprising an enclave page cache (EPC), in which a validation table is stored, and at least one NPU enclave,
   wherein the NPU enclave and the EPC have a trusted execution environment (TEE), the TEE isolated from an execution environment in which system software of the processor is executed.

2. The electronic device of claim 1, wherein the SoC further comprises:
   an access controller configured to determine whether a program requesting access to the NPU enclave is a program that may access the NPU enclave, based on the validation table.

3. The electronic device of claim 2, wherein, in an address translation process performed by an input/output memory management unit (IOMMU) of the NPU, when an NPU enclave identification (ID) of the program is not the same as an NPU enclave ID included in the validation table, the access controller blocks the access of the program.

4. The electronic device of claim 1, wherein the SoC further comprises:
   a memory protection engine configured to perform a counter mode encryption/decryption operation and to validate integrity of data by constructing a tree for the at least one NPU enclave.

5. The electronic device of claim 4, wherein
   the memory protection engine is configured to perform the counter mode encryption/decryption operation at a different granularity according to a machine learning method executed in the NPU.

6. The electronic device of claim 4, wherein
   the validation table comprises a read-only identification (ID) bit indicating whether data is read-only data, and
   the memory protection engine is configured to perform the counter mode encryption/decryption operation by setting a counter value to 1, when it is determined that the data is the read-only data.

7. The electronic device of claim 1, wherein the SoC further comprises a channel buffer connecting the processor with the NPU.

8. The electronic device of claim 7, wherein
   the processor comprises a processor enclave, which is a region having the TEE and the processor enclave is configured to execute an NPU driver, and
   the NPU driver is configured to grant a right to use the channel buffer to a trusted application that requests to use the NPU.

9. An operating method of a System on Chip (SoC) comprising a processor configured to control the SoC and a neural processing unit (NPU), the method comprising:
   transmitting, by the processor, data from at least one NPU enclave included in an external memory to an internal memory included in the SoC;

performing, by the NPU, an NPU operation, based on the data; and transmitting a result of the NPU operation to the external memory, wherein the at least one NPU enclave has a trusted execution environment (TEE), the TEE isolated from an execution environment in which system software of the processor is executed.

10. The method of claim 9, further comprising:

determining whether a program requesting access to the at least one NPU enclave is a program that may access the at least one NPU enclave, based on a validation table stored in an enclave page cache (EPC) included in the external memory; and controlling access of the program to the at least one NPU enclave based on the determination.

11. The method of claim 10, wherein the controlling of the access of the program to the at least one NPU enclave comprises blocking the access of the program when an NPU enclave identification (ID) of the program is not the same as an NPU enclave ID included in the validation table.

12. The method of claim 9, wherein the transmitting the data comprises:

performing a counter mode decryption operation on the data transmitted from the external memory to the internal memory; and validating integrity of the data by constructing a tree for the at least one NPU enclave.

13. The method of claim 12, wherein the performing the counter mode decryption operation comprises setting a counter value to 1 when it is determined that the data is read-only data.

14. The method of claim 12, wherein the performing of the counter mode decryption operation comprises performing the counter mode decryption operation at a different granularity according to a machine learning method executed by the NPU.

15. The method of claim 9, wherein the transmitting of the external memory comprises performing a counter mode encryption operation based on the result of the NPU operation, and the performing of the counter mode encryption operation comprises performing the counter mode encryption operation at a different granularity according to a machine learning method executed in the NPU.

16. The method of claim 9, further comprising:

communicating between the processor and the NPU through a channel buffer connecting the processor with the NPU.

17. The method of claim 16, wherein the processor comprises a processor enclave, which is a region having the TEE and the processor enclave is configured to execute an NPU driver, wherein the communicating through the channel buffer comprises granting, by executing the NPU driver, a right to use the channel buffer to a trusted application that requests to use the NPU.

18. An operating method of a System on Chip (SoC) comprising a processor configured to control the SoC and a neural processing unit (NPU), the method comprising:

controlling access of a program to an NPU enclave; and performing a counter mode encryption/decryption operation, wherein the NPU enclave is a region of a memory, which is used by the NPU, the NPU enclave having a trusted execution environment (TEE), the TEE isolated from an execution environment in which system software of the processor is executed.

19. The method of claim 18, wherein the controlling of the access of the program to the NPU enclave comprises determining whether the program is a program that may access the NPU enclave, based on a validation table stored in an enclave page cache (EPC) included in the memory.

20. The method of claim 18, wherein the performing of the counter mode encryption/decryption operation comprises validating integrity of data included in the NPU enclave by constructing a tree for the NPU enclave.

* * * * *